United States Patent [19]
Anderson

[11] 3,799,481
[45] Mar. 26, 1974

[54] SHOCK ABSORBER MOUNTING ASSEMBLY

[76] Inventor: Richard D. Anderson, 1650 Mulberry, Elgin, Ill. 60120

[22] Filed: Jan. 18, 1973

[21] Appl. No.: 324,742

[52] U.S. Cl.................................. 248/15, 280/96.2
[51] Int. Cl............................................ F16f 15/00
[58] Field of Search ............ 248/15, 23, 3; 267/177, 267/64; 280/91.2, 124.1, 96.2; 188/88

[56] References Cited
UNITED STATES PATENTS

| | | | |
|---|---|---|---|
| 2,611,625 | 9/1952 | Kishline et al. | 267/20 X |
| 3,443,530 | 5/1969 | Carlson | 248/188 X |
| 3,608,851 | 9/1971 | Anderson | 248/15 |

FOREIGN PATENTS OR APPLICATIONS

| | | | |
|---|---|---|---|
| 805,287 | 11/1958 | Great Britain | 267/20 |
| 150,670 | 11/1960 | U.S.S.R. | 267/177 |

Primary Examiner—J. Franklin Foss
Attorney, Agent, or Firm—Molinare, Allegretti, Newitt & Witcoff

[57] ABSTRACT

A shock absorber mounting assembly in which the shock absorber includes a cylindrical knuckle the axis of which extends perpendicular to the shock absorber axis for mounting the shock absorber between the structures which are to be shock insulated from each other and an offset bar-pin is fitted to at least one of the cylindrical knuckles and mounts the cylindrical knuckle to at least one of the structures.

6 Claims, 5 Drawing Figures

PRIOR ART

PATENTED MAR 26 1974 3,799,481
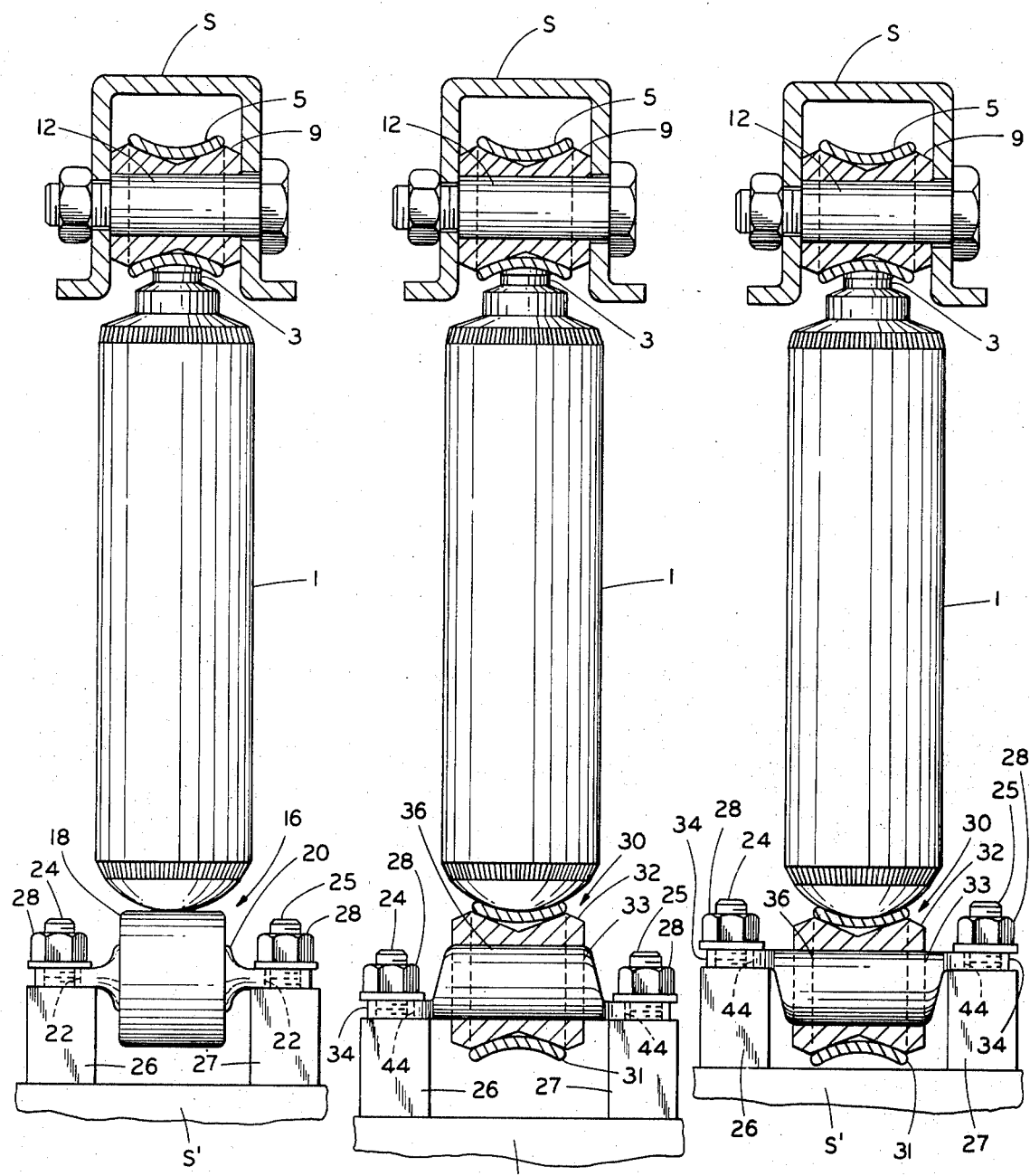
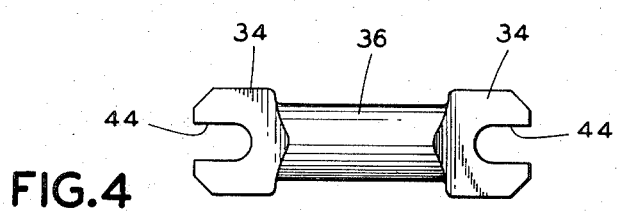
FIG.1 PRIOR ART FIG.2 FIG.3
FIG.4
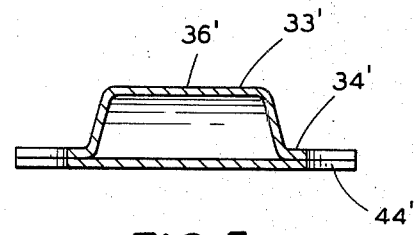
FIG.5

3,799,481

SHOCK ABSORBER MOUNTING ASSEMBLY

BACKGROUND AND SUMMARY OF THE INVENTION

This invention relates to a shock absorber mounting assembly and, more particularly, to a mounting assembly of the eye type.

In the past, shock absorbers have generally been provided in a variety of forms differing in length, as well as mounting construction from each other. Such differing construction has been necessitated by the variety of spacing distances encountered in practice between the structures to be shock insulated from each other, as well as the variety of mounting constructions for which the structures are fitted.

For example, at least two general types of shock absorber mountings have been utilized in the past, the eye type mounting and the stud type mounting. In the eye type mounting, the shock absorber carries a cylindrical knuckle at one or both ends which opens generally perpendicular to the shock absorber axis. A bar having flat ends or a bolt is positioned in the knuckle such that the bar or bolt extends from each side of the knuckle and generally perpendicular to the shock absorber axis. A bushing formed of a resilient material is positioned in the knuckle to shock insulate the bar or bolt from the shock absorber body and the extended ends of the bar or bolt are mounted to the structure at least at two points spaced from the axis of the shock absorber body. In the stud type mounting the shock absorber carries a stud which extends axially from one or both ends of the shock absorber and the shock absorber is mounted to one or both of the structures to be insulated either directly or indirectly by this stud. Where the structure is designed to receive a stud mounting, a shock absorber having an eye mounting is generally unusable and vice versa. Moreover, even where a given shock absorber carries a proper type of mounting, the shock absorber is frequently incapable of installation, since it is not of the proper length to fit between the particular structures which are to be shock insulated from each other.

In my U.S. Pat. No. 3,608,851 a shock absorber mounting is disclosed which overcomes some of the aforementioned problems in a stud type mounting.

The shock absorber mounting assembly of the present invention obviates these numerous disadvantages in a shock absorber employing an eye mounting and renders possible the inventory and use of only a single given shock absorber of a given length and mounting construction for installation in varied installation conditions in which the structures to be shock insulated are spaced from each other at various distances, as well as where the mounting construction for which the structures have been adapted to a mounting of the eye type. The shock absorber mounting assembly of my invention includes a shock absorber housing having an eye type mounting extending from at least one end and an offset bar-pin is provided to enable the eye mounting to be mounted on a mounting which is adapted to receive a bar-pin type fitting, even where the bar-pin type mounting components are spaced at varying distances from each other, without necessitating the provision of a number of different individual shock absorbers. Also the offset bar-pin of my invention is reversible to enable installation of a given length shock absorber between structures of varied spacing. The shock absorber mounting assembly of the present invention is extremely simple and inexpensive in both manufacture and use and effects a substantial reduction in the inventory of shock absorbers which must be stocked in order to meet varied installation conditions.

In a principal aspect, the shock absorber mounting assembly incorporating the principles of my invention includes an elongate shock absorber having an eye type mounting extending from at least one end and mounting means are provided on each of the ends to mount the shock absorber to the structures which are to be shock insulated from each other. A bar-pin having first and second portions which are located in different planes is received in the eye mounting and fastening means attaches the portion not positioned in the mounting to at least one of the structures.

These and other objects, features and advantages of the present invention will be more clearly understood through a consideration of the following detailed description.

BRIEF DESCRIPTION OF THE DRAWING

In the course of this description reference will be frequently made to the attached drawing in which:

FIG. 1 is an overall view of a shock absorber mounting assembly of the prior art in which the shock absorber is of the type having an eye type mounting assembly;

FIG. 2 is an overall partially cross-sectioned view of the mounting assembly incorporating the principles of my invention wherein the structures which are shock insulated from each other are spaced apart by a substantial distance;

FIG. 3 is an overall partially cross-sectioned view of the mounting assembly incorporating the principles of my invention in which the structures which are insulated from each other are spaced apart by a distance less than the distance between the structures of FIG. 2;

FIG. 4 is a plan view of a preferred embodiment of the offset bar-pin mounting of my invention; and FIG. 5 is a cross-sectioned elevation view of another preferred embodiment of bar-pin mounting of my invention.

DESCRIPTION OF THE PREFERRED EMBODIMENTS

Referring to FIG. 1, a typical prior conventional shock absorber and mounting assembly is shown which comprises a shock absorber housing 1 having the usual axially movable piston member 3 located at one end thereof which is adapted to move in and out of the housing as shock is experienced by the shock absorber. The internal details of the shock absorber form no part of my invention and accordingly will not be described. Attached to the end of the movable piston 3 is a cylindrical knuckle 5 which is adapted to fasten to one of the structures S to be shock insulated which may be, by way of example, the frame of an automobile. A suitable bushing 9, formed of a resilient material such as rubber or the like, is positioned inside the cylindrical knuckle between the cylindrical knuckle and the mounting bolt 12 and thus shock insulates and mounts one end of the shock absorber and its movable piston to the structure S.

Carried at the other end of the typical prior shock absorber housing is a conventional bar-pin type mounting assembly, generally 16, wherein a cylindrical knuckle 18 is attached to the end of the housing 1 such that its axis extends perpendicular to the housing axis as does knuckle 5. A bar-pin 20 extends through the knuckle and is firmly embedded and held in position in the knuckle by a suitable shock insulative resilient material (not shown) which fills the knuckle. Each end of the bar-pin 20 is slotted at 22 to receive studs 24 and 25 which are each carried upon suitable pedestal members 26 and 27. The pedestal members are, in turn, rigidly attached to the other structure S' which is to be shock insulated from structure S. The structure S' may be, by way of example, the axle of an automobile. Nuts 28 are threaded down upon the studs to maintain the bar-pin 20 in fixed relationship with the pedestals 26 and 27, thus attaching the other end of the shock absorber to structure S'.

As previously mentioned, such prior shock absorber mounting construction suffers numerous disadvantages. One of the primary disadvantages is that such construction necessitates the stocking of a number of different shock absorbers in order to satisfy varying installation configurations. For example, varying length shock absorbers must be stocked in order to supply the installation needs for installations in which the structures S and S' are spaced at varying distances from each other. Also where the bar-pin type pedestals 26 and 27 are spaced at differing distances from each other, a number of shock absorbers having bar-pins 20 of differing lengths must be frequently stocked in order to effectively bridge the gap between the mounting pedestals. All in all, a large inventory of different shock absorbers must frequently be stocked to meet the above-mentioned varied installation conditions.

Referring to FIGS. 2 and 3, a preferred embodiment of mounting assembly of my invention is shown which substantially overcomes these numerous difficulties and which substantially enables the installation of a single uniform shock absorber irrespective of the numerous variations previously mentioned. Since numerous individual components of the assembly of my invention are similar to the components previously described in FIG. 1, like reference numerals will be used to describe like components.

In the shock absorber mounting assembly of my invention, the bar-pin mounting assembly 16 has been replaced by a second eye type mounting 30, similar in construction to eye mounting 5. Mounting 30 includes a generally cylindrical hollow knuckle 31 with a resilient bushing 32 positioned inside the knuckle, and extending perpendicular to the opposite end of housing 1. An offset bar-pin 33 is positioned so as to extend through the hollow knuckle 31. The bar-pin 33 includes a pair of flanged portions 34 which are offset from the intermediate portion 36, the latter being of generally circular cross-section. The offset bar-pin 33 is pressed into the bushing 32 and firmly held in position along the intermediate portion 36 by the resilient material of bushing 32. Each flanged portion 34 of the bar-pin 33 has an elongated slot at 44 to receive studs 24 and 25 which are carried upon suitable pedestal members 26 and 27. The pedestal members are, in turn, rigidly attached to the other structure S' which is to be shock insulated from structure S. Nuts 28 are threaded down upon the studs 24 and 25 to maintain the bar-pin 33 in fixed relationship with the pedestals 26 and 27. The elongated slots 44 enable the use of a given offset bar-pin 33 generally irrespective of the spacing of studs 24 and 25.

Referring to FIG. 2, the plane in which the axis of the intermediate portion 36 is located is positioned so that the centerline of portion 36 is above the plane of the flanged portions 34. Such position compensates for the normally inadequate length shock absorber where the structures S and S' to be shock insulated from each other are spaced apart by a substantial distance. Referring to FIG. 3, the offset bar-pin 33 has been reversed such that the axis of the intermediate portion 36 lies beneath the plane of the flanged portions 34. Such reversal enables the installation of a shock absorber having the same length as the shock absorber shown in FIG. 2, but in an installation where the structures S and S' are spaced closer together than in the installation shown in FIG. 2.

It will be readily apparent that the mounting assembly incorporating offset bar-pin 33 may be utilized at both ends of the shock absorber thereby further extending the limits of installation of a given shock absorber.

Referring to FIGS. 4 and 5, the offset bar pin 33 of the present invention may be formed easily and inexpensively from any one of several metal stocks. In FIG. 4, the bar-pin 33 is shown formed of solid bar stock and the flanged portions 34 may be formed on the ends of the pin either by milling or stamping. In FIG. 5 another embodiment of bar-pin 33' is shown which has been formed from suitable gauge tubular stock by pressing or stamping the flanged portions 34' at the ends thereof.

It should be understood that the embodiments of the present invention which have been described are merely illustrative of one application of the principles of the invention. Numerous modifications may be made by those skilled in the art without departing from the true spirit and scope of the invention.

What is claimed is:

1. A shock absorber mounting assembly including a housing having mounting means at each end, at least one of said mounting means comprising an apertured cylindrical knuckle extending perpendicular to the axis of the housing from its end of the housing for mounting said housing between the structures which are to be shock insulated from each other, wherein the improvement in said assembly comprises in combination:

a rigid offset bar-pin having a substantially cylindrical first portion the centerline of which is located in a first plane and a second flanged portion located in a second plane spaced from said first plane, said bar-pin being reversibly associated with said cylindrical knuckle such that said portions may be selectively positioned depending upon the distance between the structures in either one or the other of at least two positions in which one of said portions is between said housing and the other of said portions in said one position and said positions are reversed in said other of the positions, fastening means for fastening said second flanged portion to one of the structures when said portions are in either of said positions, and attaching means for attaching said cylindrical portion to said cylindrical knuckle when said portions are in either of said positions.

2. The assembly of claim 1 wherein said cylindrical portion is received in the aperture of said cylindrical knuckle and said attaching means attaches said cylindrical portion in said aperture.

3. The assembly of claim 1 wherein said second flanged portion comprises flanges at each end of and extending substantially parallel to said cylindrical portion, said cylindrical portion forming the intermediate portion of said offset bar-pin.

4. The assembly of claim 1 wherein the centerline of said cylindrical portion is positioned between said flanged portion and the end of the housing when the distance between the structures which are to be insulated from each other is a given distance and wherein said flanged portion is positioned between the centerline of said cylindrical portion and the end of the housing when the distance between the structures which are to be insulated from each other is less than said given distance.

5. The assembly of claim 1 wherein said fastening means includes a pair of fixed studs spaced from each other and carried by said one structure, and a pair of flat portions each having elongated spaced apertures, said elongated apertures receiving each of said fixed studs, independently of the spacing of the studs from each other.

6. The assembly of claim 1 wherein said mounting means comprises a cylindrical knuckle extending from each end of the housing.

* * * * *